US011687606B2

(12) United States Patent
Shah et al.

(10) Patent No.: US 11,687,606 B2
(45) Date of Patent: Jun. 27, 2023

(54) SYSTEMS AND METHODS FOR DATA CARD RECOMMENDATION

(71) Applicant: MicroStrategy Incorporated, Tysons Corner, VA (US)

(72) Inventors: Utkarsh Shah, Billerica, ME (US); Sunit Vijayvargiya, Arlington, VA (US); Hussein Abdinoor Mohamed, Falls Church, VA (US)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 0 days.

(21) Appl. No.: 17/155,365

(22) Filed: Jan. 22, 2021

(65) Prior Publication Data

US 2021/0224345 A1    Jul. 22, 2021

Related U.S. Application Data

(60) Provisional application No. 62/964,233, filed on Jan. 22, 2020.

(51) Int. Cl.
*G06F 17/00* (2019.01)
*G06F 7/00* (2006.01)
*G06F 16/9535* (2019.01)
*G06F 16/957* (2019.01)
*G06F 16/9538* (2019.01)
*G06N 20/00* (2019.01)

(52) U.S. Cl.
CPC ........ *G06F 16/9535* (2019.01); *G06F 16/957* (2019.01); *G06F 16/9538* (2019.01); *G06N 20/00* (2019.01)

(58) Field of Classification Search
CPC ............... G06F 16/9535; G06F 16/957; G06F 16/9538; G06N 20/00
USPC .......................................................... 707/732
See application file for complete search history.

(56) References Cited

U.S. PATENT DOCUMENTS

| 7,640,511 | B1 * | 12/2009 | Keel ...................... G06Q 10/10 |
| | | | 707/999.102 |
| 10,902,344 | B1 * | 1/2021 | Kenthapadi ............ G06N 20/00 |
| 11,048,768 | B1 * | 6/2021 | Kolbert .................... H04L 51/52 |
| 11,120,218 | B2 * | 9/2021 | Ray ................... G06F 18/23213 |
| 2002/0052861 | A1 * | 5/2002 | Gustman ................ G06F 16/40 |

(Continued)

*Primary Examiner* — Pavan Mamillapalli
(74) *Attorney, Agent, or Firm* — Bookoff McAndrews, PLLC

(57) ABSTRACT

According to certain aspects of the disclosure, a computer-implemented method may be used for information discovery recommendation. The method may include receiving a query for a requested data card and determining information contained on a set of data cards other than the requested data card. Additionally, categorizing the information into a plurality of dimensions of data and matching the dimensions of data with information contained on the requested data card. Additionally, applying a weighting value to each of the matched plurality of dimensions of data and determining a combined weight total for each of the data cards. Additionally, determining at least one recommended data card with the highest combined weight total and displaying a user interface indicating at least one recommended data card is available. Additionally, presenting the at least one recommended data card based on a user interaction with the user interface.

20 Claims, 6 Drawing Sheets

(56) References Cited

U.S. PATENT DOCUMENTS

| | | | |
|---|---|---|---|
| 2002/0186867 A1* | 12/2002 | Gutta | G06F 16/40 382/116 |
| 2004/0093349 A1* | 5/2004 | Buinevicius | G06Q 10/00 |
| 2005/0041863 A1* | 2/2005 | Ray | G06V 40/171 382/118 |
| 2006/0184425 A1* | 8/2006 | Hanechak | G06Q 30/0631 705/26.5 |
| 2008/0021860 A1* | 1/2008 | Wiegering | G06F 16/24578 |
| 2008/0294624 A1* | 11/2008 | Kanigsberg | G06Q 30/0269 707/999.005 |
| 2009/0018996 A1* | 1/2009 | Hunt | G06Q 30/02 |
| 2009/0228918 A1* | 9/2009 | Rolff | H04N 21/4668 725/34 |
| 2012/0265736 A1* | 10/2012 | Williams | G06F 40/242 707/E17.002 |
| 2013/0117287 A1* | 5/2013 | Jagota | G06Q 10/06 707/755 |
| 2014/0172870 A1* | 6/2014 | Wang | G06F 16/2246 707/741 |
| 2014/0334721 A1* | 11/2014 | Cervin | G06V 30/416 382/160 |
| 2015/0160806 A1* | 6/2015 | Fey | G06F 16/951 715/748 |
| 2016/0140109 A1* | 5/2016 | Kim | G06F 40/205 704/9 |
| 2016/0210734 A1* | 7/2016 | Kass | G06T 7/001 |
| 2017/0361233 A1* | 12/2017 | Stirling | G06T 11/60 |
| 2018/0318719 A1* | 11/2018 | Ma | G06N 3/006 |
| 2018/0336641 A1* | 11/2018 | Dziabiak | G06Q 40/08 |
| 2019/0080416 A1* | 3/2019 | Smith | G06N 20/00 |
| 2019/0164313 A1* | 5/2019 | Ma | G06V 30/18105 |
| 2020/0043019 A1* | 2/2020 | Hadavand | G06F 40/284 |
| 2020/0065791 A1* | 2/2020 | Patil | G07G 1/0063 |
| 2020/0394265 A1* | 12/2020 | Ray | G06F 40/226 |
| 2021/0073874 A1* | 3/2021 | Wish | G06T 11/001 |
| 2021/0117664 A1* | 4/2021 | Rizvi | G06F 18/214 |

* cited by examiner

SYSTEMS AND METHODS FOR DATA CARD RECOMMENDATION

RELATED APPLICATION(S)

This application claims priority to U.S. Provisional Application No. 62/964,233 filed Jan. 22, 2020, the entire disclosure of which is hereby incorporated herein by reference in its entirety.

TECHNICAL FIELD

Various embodiments of the present disclosure relate generally to providing on demand contextually relevant information.

INTRODUCTION

Electronic networks commonly contain more information than is possible for a user to efficiently search and assimilate. A user may utilize a search engine to look up information, but this may lead to frustration, as the user may not know the words to perform an optimal search, or may not know how to acquire the most relevant information. Furthermore, requiring the user to determine a query and type the query into a search engine may also take up unnecessary time, which may lead to further negative experiences.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for providing recommendation to information discovery. Each of the examples disclosed herein may include one or more of the features described in connection with any of the other disclosed examples.

In one example, a computer-implemented method may be used for information discovery recommendation. The method may include receiving, by one or more processors, a user query for a requested data card from a user; determining, by the one or more processors, information contained on a set of data cards, wherein the set of data cards include a plurality of data cards other than the requested data card from the user; categorizing, by the one or more processors, the information into a plurality of dimensions of data; matching, by the one or more processors, the plurality of dimensions of data with information contained on the requested data card; applying, by the one or more processors, a weighting value to each of the matched plurality of dimensions of data; determining, by the one or more processors, a combined weight total for each of the data cards from the set of data cards; determining, by the one or more processors, at least one recommended data card from the set of data cards with the highest combined weight total; displaying, by the one or more processors, a user interface indicating at least one recommended data card is available; and presenting, by the one or more processors, the at least one recommended data card based on a user interaction with the user interface.

According to another aspect of the disclosure, a computer system for information discovery recommendation may include at least one memory having processor-readable instructions stored therein; and at least one processor configured to access the memory and execute the processor-readable instructions, which when executed by the processor configures the processor to perform a plurality of functions. The functions may include receiving a user query for a requested data card from a user; determining information contained on a set of data cards, wherein the set of data cards include a plurality of data cards other than the requested data card from the user; categorizing the information into a plurality of dimensions of data; matching the plurality of dimensions of data with information contained on the requested data card; applying a weighting value to each of the matched plurality of dimensions of data; determining a combined weight total for each of the data cards from the set of data cards; determining at least one recommended data card from the set of data cards with highest combined weight total; displaying a user interface indicating at least one recommended data card is available; and presenting the at least one recommended data card based on a user interaction with the user interface.

According to still another aspect of the disclosure, a non-transitory computer-readable medium comprising instructions for information discovery recommendation, the non-transitory computer-readable medium storing instructions that, when executed by at least one processor, may configure the at least one processor to perform receiving, by one or more processors, a user query for a requested data card from a user; determining, by the one or more processors, information contained on a set of data cards, wherein the set of data cards include a plurality of data cards other than the requested data card from the user; categorizing, by the one or more processors, the information into a plurality of dimensions of data; matching, by the one or more processors, the plurality of dimensions of data with information contained on the requested data card; applying, by the one or more processors, a weighting value to each of the matched plurality of dimensions of data; determining, by the one or more processors, a combined weight total for each of the data cards from the set of data cards; determining, by the one or more processors, at least one recommended data card from the set of data cards with the highest combined weight total; displaying, by the one or more processors, a user interface indicating at least one recommended data card is available; and presenting, by the one or more processors, the at least one recommended data card based on a user interaction with the user interface.

Additional objects and advantages of the disclosed embodiments will be set forth in part in the description that follows, and in part will be apparent from the description, or may be learned by practice of the disclosed embodiments. It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
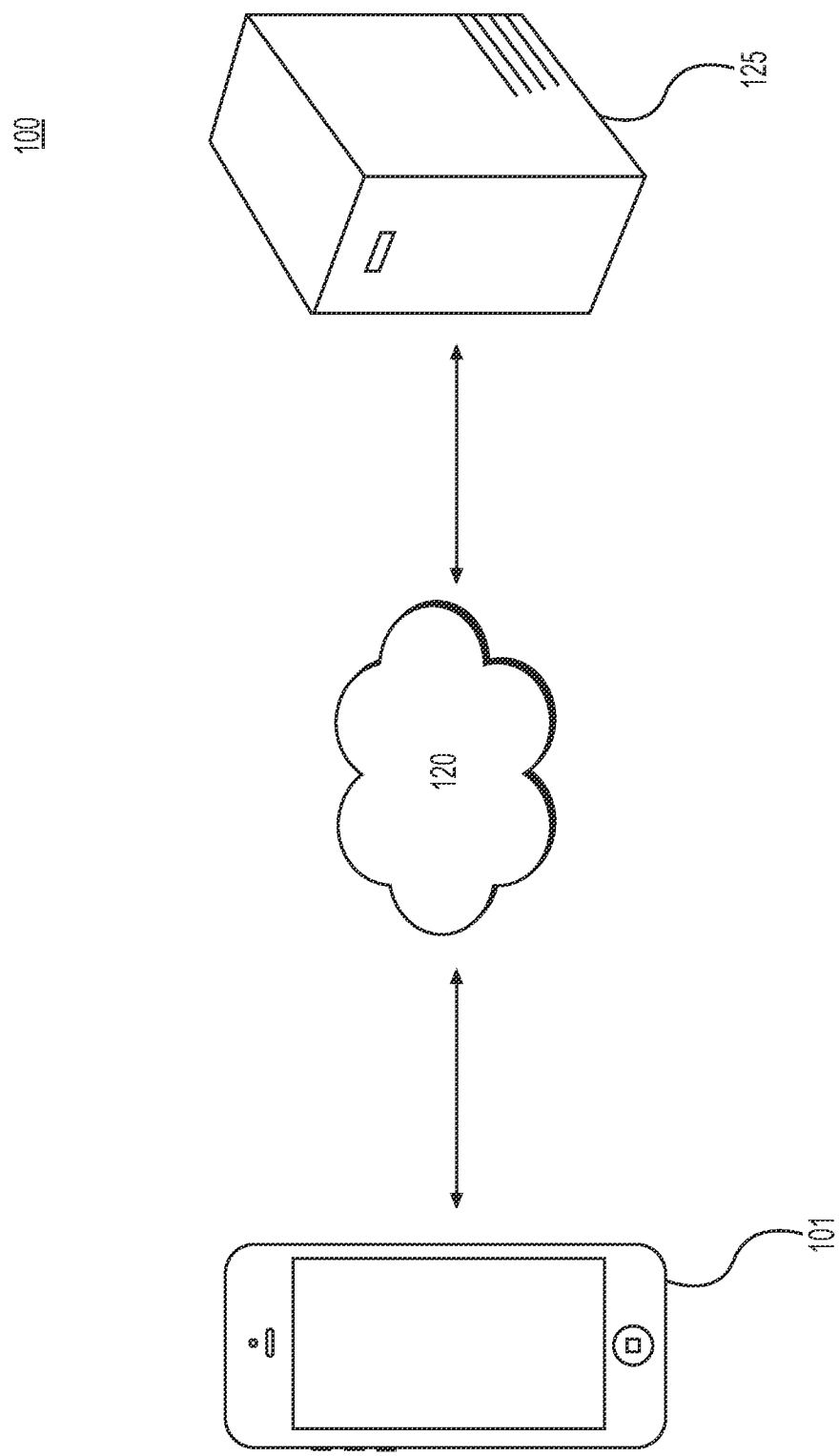
FIG. 1 depicts an exemplary environment in which systems, methods and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompany drawings. Various embodiments of the present disclosure relate generally to methods and systems for analytics integration into electronic calendars. For example, various embodiments of the present disclosure relate to accessing the calendar data of a user and creating data cards from the calendar data. In some arrangements, location information from the calendar data may be used to enhance related functions.

As described above, users searching for relevant information may be overwhelmed with the amount of information available. Often times the user may have to know in advance how to discover the information or where the information is located. For example, if the user wants to acquire information regarding a specific item or topic, the user would have to input a search query into a search engine to retrieve the information. To retrieve all the relevant information, the user may have to switch between different searching methods to ensure that information is pulled from several sources. Therefore, a need exists to minimize the burden imposed on the user by recommending discoverable information around his or her environment. A computing system may provide the ability for a user to discover relevant and related information without user input, and discover information to which the user may not be aware of or may not search for.

Referring now to the appended drawings, FIG. 1 depicts an exemplary network environment 100 in which systems, methods and other aspects of the present disclosure may be implemented. Environment 100 may include the at least one user device 101 under the operation of one or a plurality of users, a network 120, and at least one server 125. The server 125 may act as a repository for information discoverable by the user of the user device 101. The server 125 may communicate to the user device 101 via a network 120. Such network 120 may be any suitable network or combination of networks and may support any appropriate protocol suitable for communication of data between various components in the network environment 100. The network 120 may include a public network (e.g., the Internet), a private network (e.g., a network within an organization), or a combination of public and/or private networks. The server 125 may be implemented using multiple computers that cooperate to perform the functions discussed below, which may be located remotely from each other. The server 125 may be a local server, a remote server, a cloud server, or the like.

The user device 101 may be operated by one or more users to perform information discovery functions. Examples of user device 101 may include smartphones, wearable computing devices, tablet computers, laptops, and desktop computers.

Environment 100 may include one or more computer systems configured to gather, process, transmit, and/or receive data. In general, whenever environment 100 or components thereof is described as performing an operation of gathering, processing, transmitting, or receiving data, it is understood that such operation may be performed by a computer system thereof. In general, a computer system may include one or more computing devices, as described in connection with FIG. 6 below.

Figure 2:
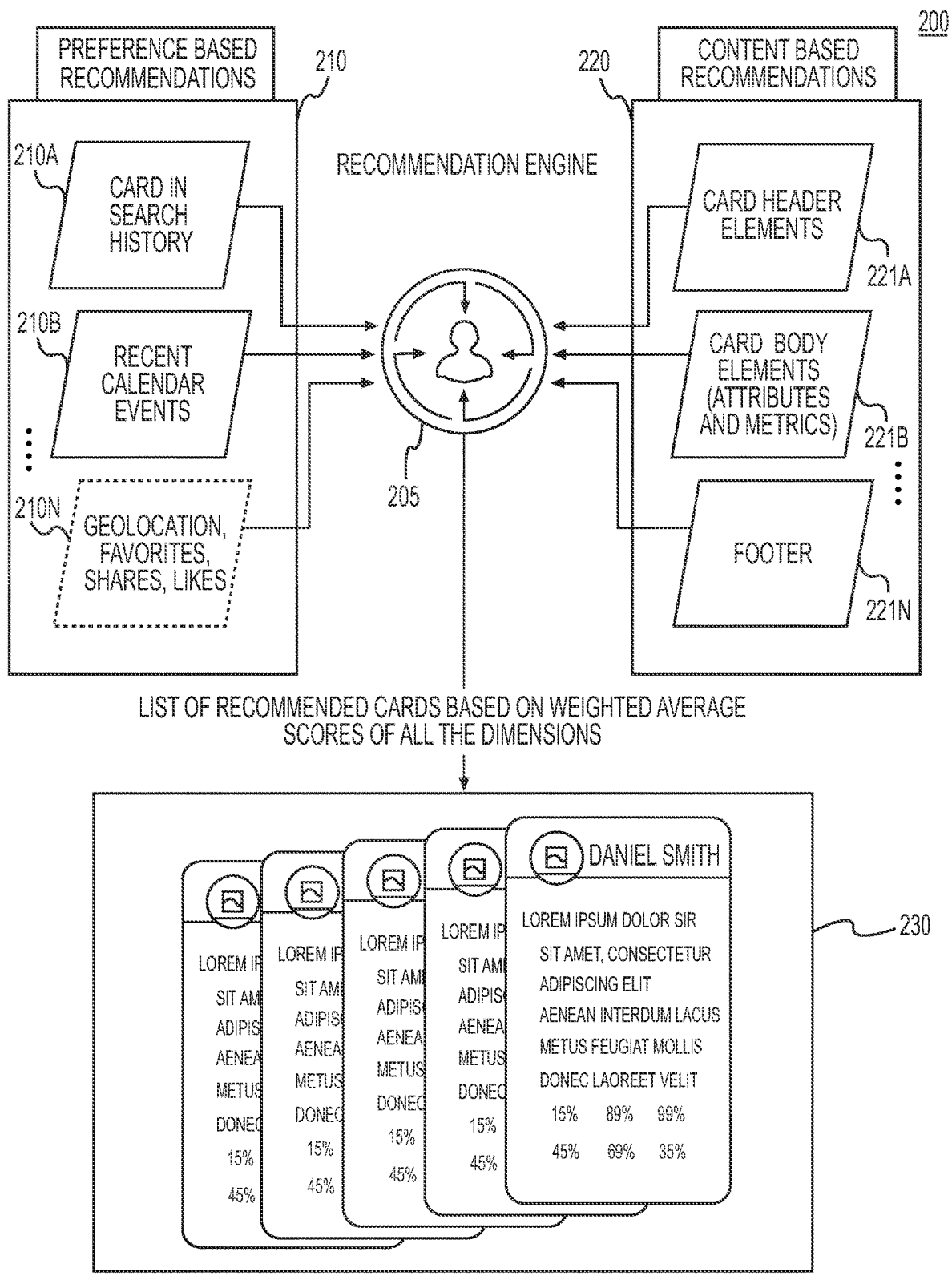
FIG. 2 depicts an exemplary environment of the recommendation engine, according to one aspect of the present disclosure.

FIG. 2 depicts exemplary environment 200 including a recommendation engine 205, according to one aspect of the present disclosure. Environment 200 may include the recommendation engine 205, preference-based recommendation factors 210, content-based recommendation factors 220, and at least one recommended data card 230. Preference-based recommendation factors 210 may include factors 210A-210N and may include user search history, recent user calendar events, user geolocation, favorites, user social sharing, user social likes or dislikes, and/or the like. Content-based recommendation factors 220 may include factors 221A-221N, and may include electronic data card header elements, data card body elements, data card footer elements, and/or the like. The recommendation engine 205 may evaluate a user requested data card using the preference-based recommendation factors 210 and/or the content-based recommendation factors 220 to determine a set of recommended data cards 230. The data cards within the set of recommended data cards 230 may be related to the user requested data card and may be sorted by a combined recommendation score. The set of recommended data cards 230 may include all data cards that have matched any of the factors within the preference-based recommendation factors 210 and/or the content-based recommendation factors 220. In another embodiment, the set of recommended data cards 230 may only include data cards that meet or exceed a predetermined combined recommendation score. The predetermined combined recommendation score may be user adjustable to allow the user to tailor the set of recommended data cards 230 according to the preferences of the user. According to an embodiment, the predetermined combined recommendation score may be determined by a machine learning model trained to output the combined recommendation score based on one or more inputs such as, but not limited to, past recommendations, past recommendation scores, the preference-based recommendation factors 210 and/or the content-based recommendation factors 220.

Figure 3:
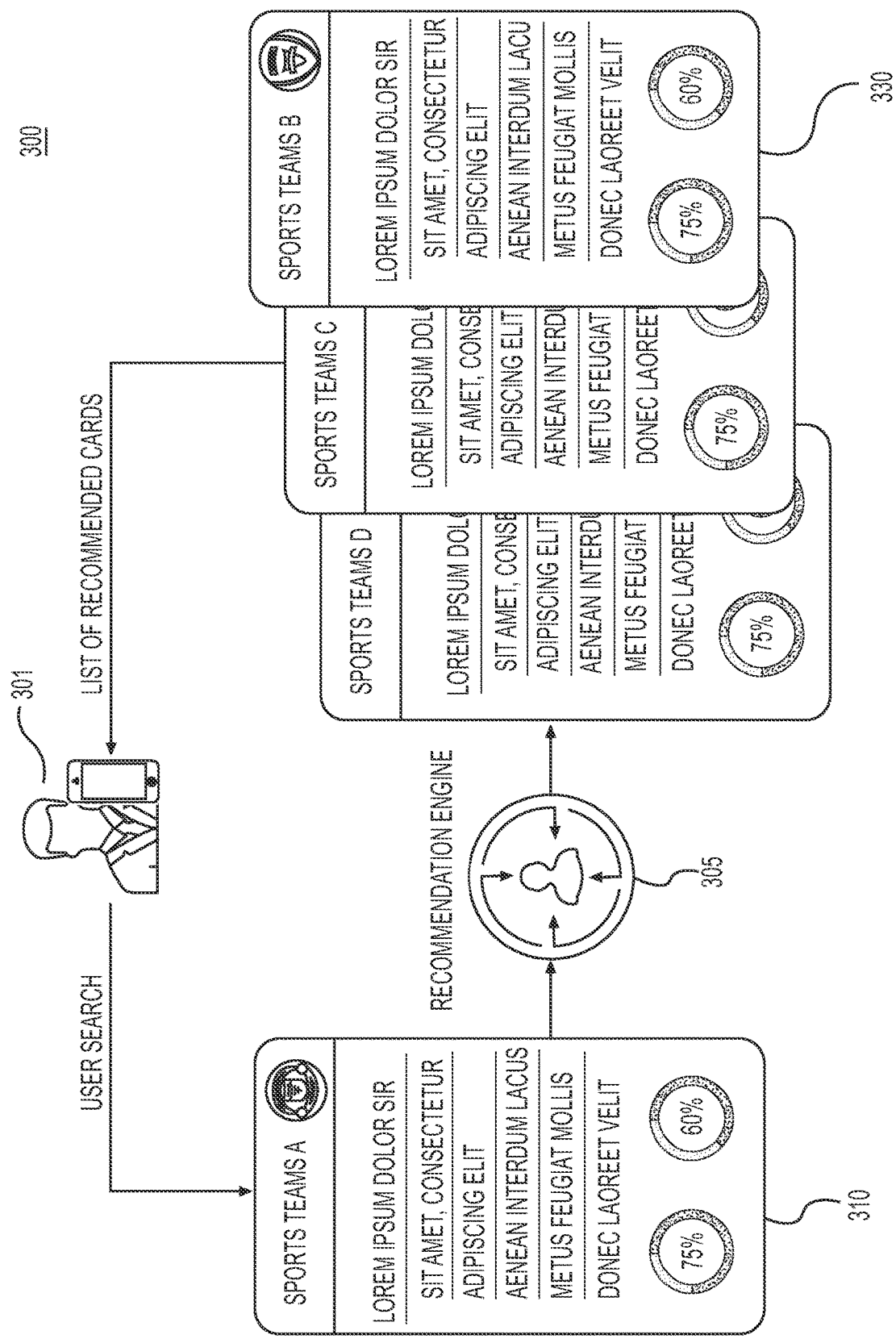
FIG. 3 depicts an exemplary diagram for recommendations based on user queries, according to one aspect of the present disclosure.

FIG. 3 depicts an exemplary diagram 300 for information discovery recommendation based on user queries, according to one aspect of the present disclosure. The exemplary diagram 300 may include a user device 301, user requested data card 310, recommendation engine 305, and a set of recommended data cards 330. User device 301 may correspond to the user device 101 depicted in FIG. 1. The recommendation engine 305 and set of recommended data cards 330 may correspond to the recommendation engine 205 and the set of recommended data cards 230 depicted in FIG. 2, respectively.

A user may enter a search query into the user device 301 for searching a data card 310. Upon the user finding a data card 310, the recommendation engine 305 may evaluate the data card 310 for any relevant data cards to recommend to the user. To determine the relevant set of recommended data cards 330, the recommendation engine 305 may evaluate the information contained in each of the data cards and apply preference-based recommendation factors 210 and content-based recommendation factors 220 to narrow data cards to a set of relevant data cards for recommendation.

In the embodiment of applying content-based recommendation factors 220, information on each of the data cards may be grouped into multiple collections of information. For example, each data card may have a card header element, card body element, and card footer element. Card header element may contain information related to a name, title, and/or subtitle of a person or company of the data card. Card body element may contain information related to various attributes and metrics of the person or company of the data card. Card footer element may contain various information that does not belong in the other collections of information. As an example, a data card of a person may list the name of the person (e.g., John Smith) and title (e.g., Executive) in the card header element. The data card may also list various attributes (e.g., phone number, email address, office location, projects involved in, etc.) in the card body element. The data card may further list other various information (e.g., hobby, favorites, dislikes, etc.) in the card footer element. As another example, a data card of a company may list the name of the company (e.g., ACME Movies) and category (e.g., Movie streaming service) in the card header element. The data card may also list various attributes (e.g., phone number, email address, office location, etc.) in the card body element. The data card may further list other various information (e.g., service prices, service ratings, etc.) in the card footer element.

In one embodiment, the recommendation engine 305 may determine the set of recommended data cards 330 by comparing the information contained on all the data cards to the information contained on the user requested data card 310. For example, a user may query for a data card of Sports Team A and the data card 310 may contain key value information regarding Sports Team A, as represent by table 1 below:

TABLE 1

| Team Name | Sports Team A |
|---|---|
| Type of Sport | Football |
| Conference | Conference A |
| Win | 13 |
| Losses | 3 |

The recommendation engine 305 may then evaluate all other data cards to determine the number of matching key value pairs. For example, other data cards may be represented by the table 2 below:

TABLE 2

| | Data card 1 | Data card 2 | Data card 3 |
|---|---|---|---|
| Team Name | Sports Team B | Sports Team C | Sports Team D |
| Type of Sport | Football | Basketball | Football |
| Conference | Conference B | Conference C | Conference A |
| Wins | 10 | 13 | 13 |
| Losses | 3 | 4 | 4 |

In this example, the user requested data card 310 may have two matching key value pairs with data card 1 (e.g., Football, and number of losses), one matching key value pair with data card 2 (e.g., number of wins), and three matching key value pairs with data card 3 (e.g., Football, Conference A, and number of wins). The recommendation engine may determine that data card 3 may be the most relevant data card to the user requests data card 310 because data card 3 has the most matching key value pairs and may present data card 3 to the user as a recommendation. The recommendation engine may also order the three data cards by the number of matching key value pairs and recommend all three data cards to the user in decreasing order of number of matching key value pairs, with the order being data card 3, data card 1, and data card 2. The order may be based on a ranking of the applicable data cards and their corresponding scores (e.g., weighted values, as further described herein).

In another embodiment, a weighting value may be assigned to each of the collections of information to determine the set of recommended data cards 330. For example, the recommendation engine or the user may assign a weighting value to the card header element, card body element, and/or the card footer element. The weighting value may represent the importance of the information to the user, with a high weighting value representing higher importance and low weighting value representing lower importance. Referring to table 1 and table 2 above, the user may assign a weighting value of twenty-five to football, twenty to conference, fifty to wins and five to losses. In this example, data card 1 may have a score of thirty (e.g., football and number of losses), data card 2 may have a score of fifty (e.g., number of wins) and data card 3 may have a score of ninety-five (e.g., football, conference, number of wins). The recommendation engine may determine that data card 3 may be the most relevant data card when the user requests data card 310 because data card 3 has the highest weighted average score. The recommendation engine may then suggest presenting data card 3 to the user as a recommendation. The recommendation engine may also order (e.g., rank) the three data cards by the weighted average score and recommend all three data cards to the user in decreasing order of weighted average score, with the order being data card 3, data card 2, and data card 1 in this example. According to an embodiment, the weighting value may be automatically determined (e.g., by the recommendation engine, a machine learning algorithm, etc.). The weighting value may be automatically determined based on historical data (e.g., a card in search history 210A), based on a search query, based on a user requested data card 310, or the like.

In yet another embodiment, preference-based recommendation factors 210 may be applied to the data cards to determining the set of recommended data cards 330. Preference-based recommendation factors 210 may include recent search history of the user, recent user calendar events, geolocation of the user, social activities of the user, or the like. For example, a user may query a data card of a specific person, the recommendation engine 305 may evaluate the user requested data card and determine that the person has an overlapping calendar event with the user. The recommendation engine 305 may search and see if any other users are included in the same calendar event and present the data cards of those other users as recommended data cards. As another example, a user may query a data card of a specific person, the recommendation engine 305 may evaluate the user requested data card and determine that the person is within a predetermined geographic location of the user. The recommendation engine 305 may search and see if any other users are within the predetermined geographic location of the user and present the data cards of those other users as recommended data cards. The preference-based recommendation factors 210 may also be applied with the application of content-based recommendation factors 220. For example, a set of recommended data cards may be determined after the application of content-based recommendation factors 220, the recommendation engine 305 may apply the preference-based recommendation factors 210 to reduce the set of recommended data cards to be displayed to the user.

In a further embodiment, a weighting value may be assigned to each of the preference-based recommendation factors to determine the set of recommended data cards 330. For example, the recommendation engine or the user may assign a weighting value to each of the preference-based recommendation factors based on the importance of the preference. For example, the user may assign a higher weighting value to geolocation than to calendar events, as the result, the recommendation engine 305 may recommend data cards within a predetermined geographic location of the user before recommending data cards related to the calendar events of the user. The weighted preference-based recommendation factors may also be applied with the application of the weighted content-based recommendation factors. The weighted preference-based recommendation factors and the content-based recommendation factors may be combined to form a combined recommendation score for each of the data cards. The recommendation engine 305 may determine the set of recommended data cards 330 based on the combined recommendation score of the data cards and present the set of recommended data cards 330 to the user, or provide the recommended data cards 330 for presentation to the user. The recommendation engine 305 may also incorporate machine learning algorithms to learn the preference of the user overtime and tailor the application of the preference-based recommendation factors 210 based on the preferences of the user. According to an embodiment, the weighting value may be automatically determined (e.g., by the recommendation engine, the machine learning algorithm, etc.). The weighting value may be automatically determined based on historical data (e.g., a card in search history 210A), based on a search query, based on a user requested data card 310, or the like.

In the above discussed embodiments, the recommendation engine 305 may perform the recommendation operations on the server 125 or on the user device 101. If the recommendation engine 305 performs the recommendation operations on the server 125, the server 125 may transmit the set of recommended data cards 330 to the user device 101 via network 120.

Figures 4A, 4B:
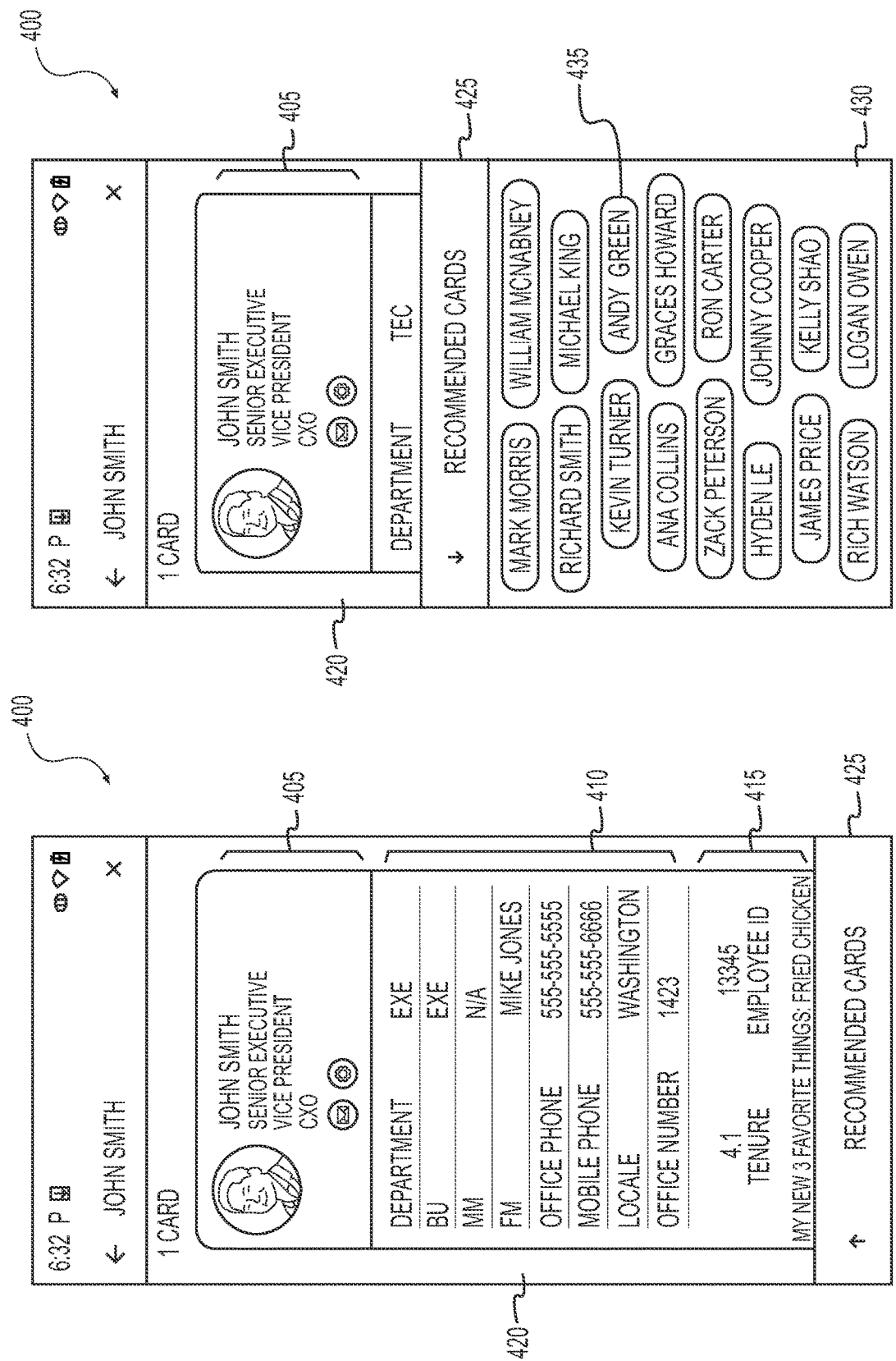
FIGS. 4A-4B depict exemplary user interfaces for information discovery recommendation, according to one aspect of the present disclosure.

FIGS. 4A-4B depict exemplary user interfaces 400 for information discovery recommendation, according to one aspect of the present disclosure. In FIG. 4A, interface 400 may include user requested data card 420, card header element 405, card body element 410, card footer element 415, and recommendation data cards indication 425. The user may query for the data card of John Smith, and the data card containing information of John Smith may be displayed on the user device 101. The recommendation engine may evaluate the information contained on the data card and apply content-based recommendation factors and/or preference-based recommendation factors to determine a set of recommended data cards. If the set of recommended data cards are determined, then the recommendation data cards indication 425 may be displayed on the interface 400 to indicate to the user that one or more recommendation data cards exist. The user may interact with the indication 425 via touch, mouse, keyboard, or other gestures to display the available recommendation data cards.

FIG. 4B depicts the exemplary user interface 400 displaying the available recommendation data cards. In FIG. 4B, interface 400 may include user requested data card 420, card header element 405, and expanding the recommendation data cards indication 425 to display 430 displaying the available recommendation data cards. As displayed in display 430, data cards 435 of names of people and/or entities related to the user requested data card 420 of John Smith may be displayed. The names may be displayed via display 430 with an indication that the names may be interactive. For example, the names may be displayed as a hyperlink, or a touchable design element to indicate to the user that more data cards associated with the names and/or entities may be available. While the recommendation data cards indication 425 is shown at the bottom of the display, this indication may be located anywhere on the interface.

Upon interacting with the names displayed via the display 430, the recommended data cards 435 may be displayed to the user. If there is more than one data card available, (e.g., when more than one names are present) then the user may navigate between the different data cards using gestures or navigation commands. The data cards may be stored locally on the user device 101 and retrieved by the device upon an interaction by the user with the names. In another embodiment, the data cards may be stored on the server 125 and retrieved by the user device 101 via network 120 upon an interaction by the user with the names.

Figure 5:
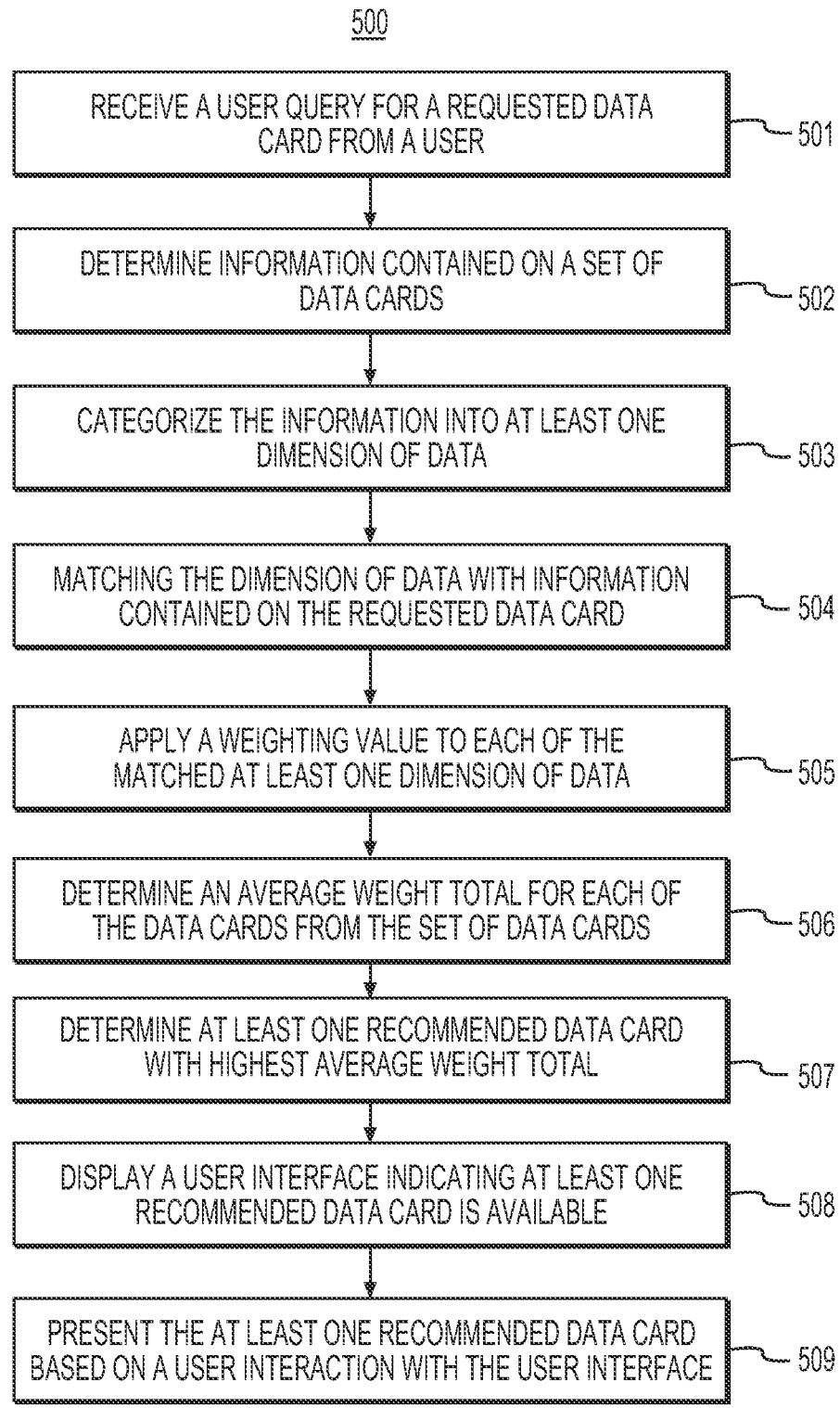
FIG. 5 depicts an exemplary flow diagram of information discovery recommendation, according to one aspect of the present disclosure.

FIG. 5 depicts an exemplary flow diagram 500 of information discovery recommendation, according to one aspect of the present disclosure. Flow diagram 500 may begin at step 501 where a user query is received for a requested data card. At step 502, information contained on a set of data cards may be evaluated. In step 503, the information contained on the set of data cards may be categorized into at least one dimension of data. For example, the information may be contained in the header of the data card, or may be contained in the body of the data card, or may be contained in the footer of the data card. Upon determining the dimensions of data, at step 504 the dimension of data determined from the set of data cards may be matched to the information contained on the user requested data card. After determining matching data, at step 505 a weighting value may be applied to each of the at least one matched dimensions of data. The weighting value may be adjustable by the user or a recommendation engine.

At step 506, an average weight total of each of the data cards from the set of data cards may be calculated and determined by the recommendation engine. At step 507, the recommendation engine may determine the at least one data card from the set of data cards with the highest average weight total. The data card with the highest weight total may be determined to be a recommended data card. The recommendation engine may also determine multiple data cards to be recommended data cards. If multiple recommended data cards exist, the recommendation engine may sort the multiple data cards by the average weight total, with the data card with the highest average weight total be presented to the user first. At step 508, a user interface may be presented to the user with an indication that at least one recommended data card is available. The indication may be a user interface element, a user interface icon, a user interface notification, or other relevant user interface designs. At step 509, the user device may detect that the user has interacted with the user interface, and may present the at least one recommended data cards to the user for display. The user may interact with the user interface via touch, gestures, voice, mouse, keyboard, or any other methods of software interaction.

Figure 6:
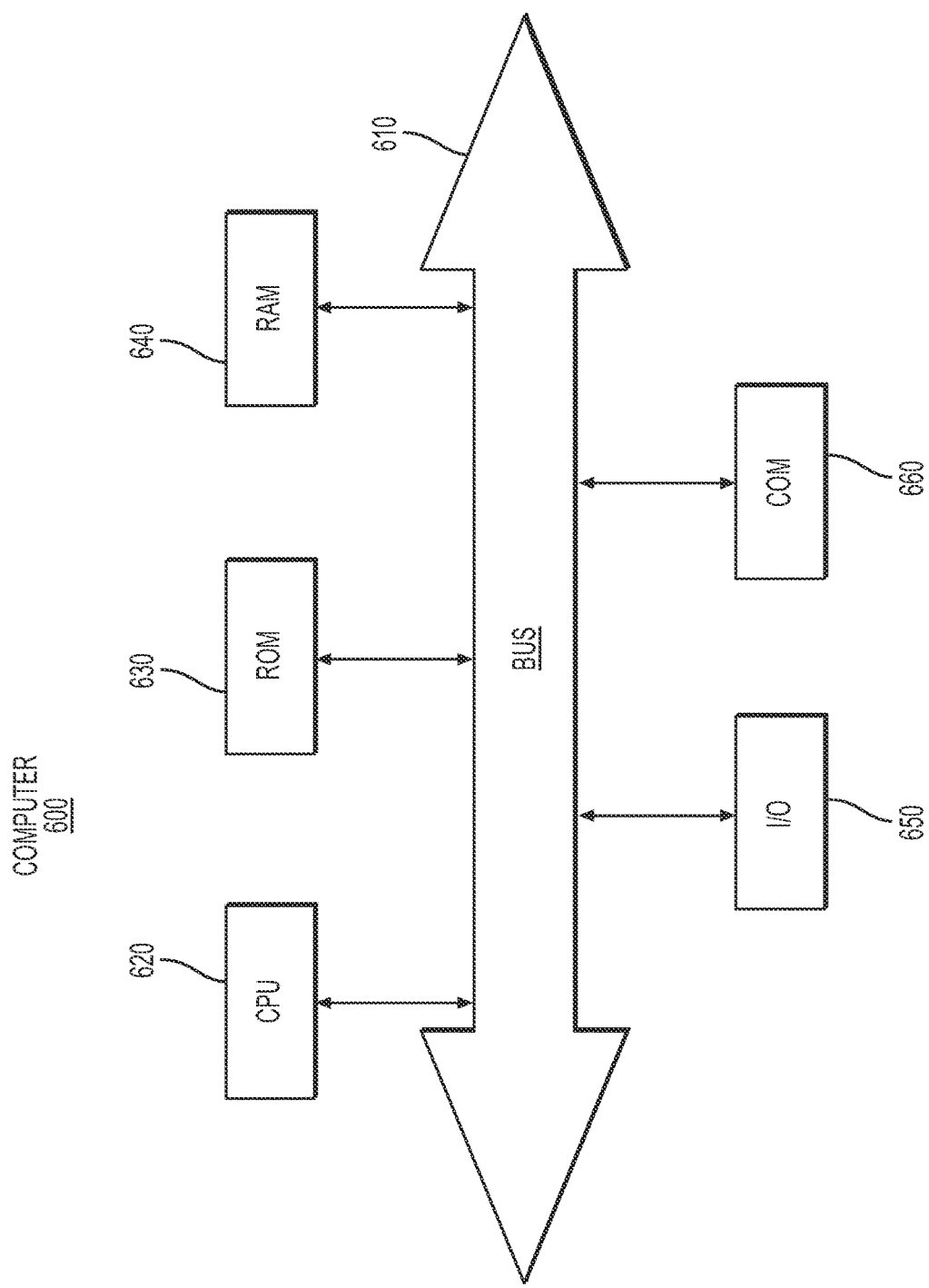
FIG. 6 depicts an exemplary computer device or system in which embodiments of the present disclosure, or portions thereof, may be implemented.

FIG. 6 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-5 can be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-5.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-5, may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, device 600 may include a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for information discovery recommendation, the method comprising:
   receiving, by one or more processors from a user, a user query for a data card;
   determining, by the one or more processors, a requested data card matching the user query;
   determining, by the one or more processors, information contained on a set of data cards, the set of data cards being other than the requested data card matching the user query;
   categorizing, by the one or more processors, the information contained on the set of data cards, the set of data cards being other than the requested data card matching the user query, into a plurality of dimensions of data;
   matching, by the one or more processors, the plurality of dimensions of data with information contained on the requested data card matching the user query;
   applying, by the one or more processors, a weighting value for each of the matched plurality of dimensions of data;
   determining, by the one or more processors, a combined weight total for each of the data cards from the set of data cards, the set of data cards being other than the requested data card matching the user query, using the weighting value for each of the matched plurality of dimensions of data;
   determining, by the one or more processors, at least one recommended data card from the set of data cards, the set of data cards being other than the requested data card matching the user query, with highest combined weight total;
   displaying, by the one or more processors, a user interface indicating the at least one recommended data card is available; and
   presenting, by the one or more processors, the at least one recommended data card based on a user interaction with the user interface.

2. The computer-implemented method of claim 1, wherein the plurality of dimensions of data includes at least one of title, subtitle, attributes, metrics, and/or footer.

3. The computer-implemented method of claim 1, further comprising:
   determining, by the one or more processors, a preference of the user.

4. The computer-implemented method of claim 3, further comprising:
   adjusting, by the one or more processors, the weighting value based on the preference of the user.

5. The computer-implemented method of claim 3, wherein determining at least one recommended data card further includes combining the combined weight total with the preference of the user to determine a combined recommendation score.

6. The computer-implemented method of claim 5, further comprising: ranking the at least one recommended data card based on the combined recommendation score.

7. The computer-implemented method of claim 1, wherein determining at least one recommended data card further includes determining the at least one recommended data card using a machine learning algorithm.

8. A computer system for information discovery recommendation, the computer system comprising:
  at least one memory having processor-readable instructions stored therein; and
  at least one processor configured to access the memory and execute the processor-readable instructions, which when executed by the processor configured the processor to perform a plurality of functions, the plurality of functions comprising:
  receiving a user query for a data card from a user;
  determining a requested data card matching the user query;
  determining information contained on a set of data cards other than the requested data card matching the user query;
  categorizing the information contained on the set of data cards, the set of data cards being other than the requested data card matching the user query, into a plurality of dimensions of data;
  matching the plurality of dimensions of data with information contained on the requested data card matching the user query;
  applying a weighting value for each of the matched plurality of dimensions of data;
  determining a combined weight total for each of the data cards from the set of data cards, the set of data cards being other than the requested data card matching the user query;
  determining at least one recommended data card from the set of data cards, the set of data cards being other than the requested data card matching the user query, with highest combined weight total;
  displaying a user interface indicating the at least one recommended data card is available; and
  presenting the at least one recommended data card based on a user interaction with the user interface.

9. The computer system of claim 8, wherein the plurality of dimensions of data includes at least one of title, subtitle, attributes, metrics, and/or footer.

10. The computer system of claim 8, wherein the plurality of functions further comprises:
  determining a preference of the user.

11. The computer system of claim 10, wherein the plurality of functions further comprises:
  adjusting the weighting value based on the preference of the user.

12. The computer system of claim 10, wherein the function of determining at least one recommended data card further includes combining the combined weight total with the preference of the user to determine a combined recommendation score.

13. The computer system of claim 12, wherein the plurality of functions further comprises:
  ranking the at least one recommended data card based on the combined recommendation score.

14. The computer system of claim 8, wherein the function of determining at least one recommended data card further includes determining the at least one recommended data card using a machine learning algorithm.

15. A non-transitory computer-readable medium comprising instructions for information discovery recommendation, the non-transitory computer-readable medium storing instructions that, when executed by at least one processor, configure the at least one processor to perform:
  receiving, by one or more processors from a user, a user query for a data card;
  determining, by the one or more processors, a requested data card matching the user query;
  determining, by the one or more processors, information contained on a set of data cards other than the requested data card matching the user query;
  categorizing, by the one or more processors, the information contained on the set of data cards, the set of data cards being other than the requested data card matching the user query, into a plurality of dimensions of data;
  matching, by the one or more processors, the plurality of dimensions of data with information contained on the requested data card matching the user query;
  applying, by the one or more processors, a weighting value for each of the matched plurality of dimensions of data;
  determining, by the one or more processors, a combined weight total for each of the data cards from the set of data cards, the set of data cards being other than the requested data card matching the user query, using the weighting value for each of the matched plurality of dimensions of data;
  determining, by the one or more processors, at least one recommended data card from the set of data cards, the set of data cards being other than the requested data card matching the user query, with highest combined weight total;
  displaying, by the one or more processors, a user interface indicating the at least one recommended data card is available; and
  presenting, by the one or more processors, the at least one recommended data card based on a user interaction with the user interface.

16. The non-transitory computer-readable medium of claim 15, wherein the plurality of dimensions of data includes at least one of title, subtitle, attributes, metrics, and/or footer.

17. The non-transitory computer-readable medium of claim 15, further comprising:
  determining, by the one or more processors, a preference of the user.

18. The non-transitory computer-readable medium of claim 17, further comprising:
  adjusting, by the one or more processors, the weighting value based on the preference of the user.

19. The non-transitory computer-readable medium of claim 17, wherein determining at least one recommended data card further includes combining the combined weight total with the preference of the user to determine a combined recommendation score.

20. The non-transitory computer-readable medium of claim 19, further comprising:
  ranking the at least one recommended data card based on the combined recommendation score.

* * * * *